(12) United States Patent
Schweitzer

(10) Patent No.: US 8,025,559 B2
(45) Date of Patent: Sep. 27, 2011

(54) DEVICE FOR CONNECTING AIR DUCTS, MOTOR VEHICLE DOOR, MOTOR VEHICLE PILLAR AND MOTOR VEHICLE INTERIOR PANELING

(75) Inventor: Marco Schweitzer, Medringen (DE)

(73) Assignee: Faurecia Innenraum Systeme, Hagenbach (DE)

( * ) Notice: Subject to any disclaimer, the term of this patent is extended or adjusted under 35 U.S.C. 154(b) by 641 days.

(21) Appl. No.: 12/067,237

(22) PCT Filed: Sep. 19, 2006

(86) PCT No.: PCT/EP2006/066492
§ 371 (c)(1),
(2), (4) Date: Jul. 16, 2008

(87) PCT Pub. No.: WO2007/060042
PCT Pub. Date: May 31, 2007

(65) Prior Publication Data
US 2008/0293348 A1    Nov. 27, 2008

(30) Foreign Application Priority Data
Nov. 28, 2005  (DE) .......................... 10 2005 056 891

(51) Int. Cl.
*B60H 1/24* (2006.01)
*B60H 1/00* (2006.01)
(52) U.S. Cl. .............. 454/69; 454/143; 285/31; 285/81; 285/108; 285/303
(58) Field of Classification Search .................... 454/69, 454/143; 285/31, 81, 82, 108, 303, 319; 296/208
See application file for complete search history.

(56) References Cited

U.S. PATENT DOCUMENTS

| | | | | |
|---|---|---|---|---|
| 3,351,363 A | * | 11/1967 | Downey et al. | 285/303 |
| 4,432,213 A | * | 2/1984 | Katahira et al. | 62/239 |
| 4,758,023 A | * | 7/1988 | Vermillion | 285/7 |
| 4,783,115 A | * | 11/1988 | Galubensky et al. | 296/208 |
| 5,551,667 A | * | 9/1996 | Galka et al. | 251/212 |
| 6,273,495 B1 | * | 8/2001 | Haba et al. | 296/193.02 |
| 6,319,113 B1 | * | 11/2001 | Allershausen | 454/143 |
| 6,467,817 B1 | * | 10/2002 | Rhyman | 285/319 |
| 6,582,005 B2 | * | 6/2003 | Takano | 296/70 |
| 6,582,011 B2 | * | 6/2003 | Palazzolo et al. | 296/208 |
| 6,739,968 B1 | * | 5/2004 | Gehring et al. | 454/152 |
| 6,796,586 B2 | * | 9/2004 | Werth | 285/243 |
| 6,832,784 B1 | * | 12/2004 | Chen | 285/7 |

(Continued)

FOREIGN PATENT DOCUMENTS
DE    1929373    12/1965
(Continued)

OTHER PUBLICATIONS

Harzendorf et al., EP 0667478 A1 machine translation, Aug. 1995.*

(Continued)

*Primary Examiner* — Steven B McAllister
*Assistant Examiner* — Phillip E Decker
(74) *Attorney, Agent, or Firm* — Matthew B. Dernier, Esq.; Gibson & Dernier LLP

(57) ABSTRACT

The invention concerns a device for connecting first and second air ducts using a connecting element for transferring an air stream between the air ducts, wherein the connecting element can assume various snap-in positions relative to the first air duct.

16 Claims, 5 Drawing Sheets

U.S. PATENT DOCUMENTS

| | | | |
|---|---|---|---|
| 6,837,525 B2 * | 1/2005 | Miyajima | 285/319 |
| 7,500,697 B2 * | 3/2009 | Romack | 285/328 |
| 7,552,947 B2 * | 6/2009 | Ryhman | 285/308 |
| 2003/0062722 A1 * | 4/2003 | Linhart | 285/319 |
| 2004/0051302 A1 * | 3/2004 | Canale | 285/7 |
| 2008/0093843 A1 * | 4/2008 | Noroozi et al. | 285/81 |
| 2010/0320746 A1 * | 12/2010 | Lin et al. | 285/31 |

FOREIGN PATENT DOCUMENTS

| | | |
|---|---|---|
| DE | 10137998 A1 | 2/2003 |
| DE | 19926380 A1 | 1/2004 |
| DE | 10322878 A1 | 1/2005 |
| EP | 0553482 A1 | 8/1993 |
| EP | 667478 A1 * | 8/1995 |
| EP | 1281909 | 2/2003 |
| FR | 2554899 | 5/1985 |

OTHER PUBLICATIONS

German International Search Report and Written Opinion for PCT/EP2006/066492.

German International Preliminary Report and Written Opinion for PCT/EP2006/066492.

* cited by examiner

DEVICE FOR CONNECTING AIR DUCTS, MOTOR VEHICLE DOOR, MOTOR VEHICLE PILLAR AND MOTOR VEHICLE INTERIOR PANELING

BACKGROUND

This invention concerns a device for connecting air ducts, in particular in a motor vehicle, as well as a motor vehicle door, a motor vehicle pillar and a motor vehicle interior paneling, in particular an instrument panel.

It is well-known that for enhanced air conditioning of the vestibule in a motor vehicle, air must not only be guided via a duct in the middle of the vehicle on the tunnel into the rear area of the vehicle, but also laterally, by means of an air duct over the respective front door and the so-called B-pillar. From the B-pillar, for example, the air then travels at chest height into the rear interior. Such ventilation systems are used for various motor vehicle types.

We know from DE 199 26 380 A1 of a duct transition for bridging the gap between the front door and the B-pillar by means of a duct component that is moldable and/or maneuverable in its longitudinal expansion, in particular a maneuverable bellows. The maneuverable duct component creates a maneuverable sealing surface, which bridges the existing gap when the door is closed and is pulled back into a retracted position that does not hinder climbing in and out of the automobile when the door is open. The operating component used to mold or maneuver the duct component is designed as a lever. In this connection, a lever component acts as a frame, in which an opening of the moldable duct component is stretched. A similar arrangement is known from DE 199 26 380 A1.

The disadvantage of this previously known air duct is its expensive design and the wear and tear resulting from the movement and/or deformation of the duct component with each opening and closing of the door. A further disadvantage is the fact that the door becomes relatively sluggish. In addition, a considerable amount of leak air can enter the joint area with this design.

Additional snap-in connection structures are also known from DE 103 22 878 A1 and DE 101 37 998 A1.

SUMMARY OF THE INVENTION

The task which forms the basis of the invention is to create a better device for connecting the first and second air ducts as well as a correspondingly improved motor vehicle door, motor vehicle pillar and motor vehicle interior paneling component, in particular a dashboard.

The device according to the invention has a connecting element for transferring an air stream between two air ducts, wherein various snap-in positions can be selected for the connecting element relative to one of the air ducts.

Of particular advantage here is the fact that a balance of tolerance can be created between the air ducts based on the various snap-in positions available. The impermeability of the connection between the two air ducts can thereby be improved. Due to the improved impermeability, the air stream can be conducted from one air duct to the other at an essentially undiminished strength, since there is no loss or virtually no loss based on the discharge of so-called leak air in the area of the connection of the two air ducts. This has the further advantage that noises which occur due to the discharge of leak air can be prevented or decreased.

According to one embodiment of the invention, the connecting element has a seal, which is designed to lie against an opening of the air duct being connected. The seal can, for example, be designed as a circular sealing lip.

In one embodiment of the invention, the air ducts which are to be connected to each other are arranged so as to be maneuverable relative to each other. For example, one of the air ducts can be swiveling relative to the other air duct. If the swiveling air duct is in a swiveling position, then the connection between the two air ducts is separated. If the swiveling air duct is swiveled back into a closed position, the connecting element then connects the two ducts to each other in a detachable manner, so that the connection can again be separated by swinging it open again.

The swiveling axis can therefore run vertically for all intents and purposes, for example when one of the air ducts is arranged in the front door of a motor vehicle. The swiveling axis can also run horizontally for all intents and purposes, if it pertains to a hatch door of a motor vehicle or to the front door of a sports car that can swivel upward.

Alternatively to or in addition to a swiveling motion, the air ducts can also be arranged in such a way that they can carry out an essentially translational movement relative to one another, as can be the case with the sliding door of a small transporter or minivan, for example.

According to one embodiment of the invention, the device has a fastening element for fastening the connecting element to one of the air ducts. To attach the connecting element, the fastening element is first attached to the air duct. This can be by means of adhesive sealing, welding or by means of a snap connection.

The different snap-in positions for the connecting element are determined by the fastening element fastened to the air duct. For example, the connecting element can be brought into the various snap-in positions inside the fastening element. Preferably, a snap-in position will be selected in such a way that the tolerance with respect to positioning of the air ducts being connected to each other is reduced and/or balanced.

According to one embodiment of the invention, the fastening element has at least one snap-in element for each snap-in position. In this way, a snap connection can be formed using the connecting element in the respective snap-in position selected. The snap connection is preferably removable.

In one embodiment of the invention, the connecting element has at least one snap-on hook, to effect the snap connection in the selected snap-in position with the fastening element.

In one embodiment of the invention, the fastening element has a guide for at least one locking element for locking the snap connection, which is located between the fastening element and the connecting element. The snap-on hook is blocked in a locking position by the locking element, so that it cannot come out of its snap-in position.

If the locking element has been moved along the guide into a release position, the snap-on hook will thereby be released, so that it can snap out of its snap-in position and the connecting element can be moved into another snap-in position, where the snap-on hook once again engages. After the connecting element has been brought into the selected snap-in position in this way, the locking element will again be brought into a locking position in order to block the snap-on hook in the selected snap-in position.

In one embodiment of the invention, the guide for the locking element is blanked off by a bar. The bar has a stopping element for forming a stop with the locking element in the release position. The stopping element can prevent the locking element from falling out of the guide when it is being moved into the release position.

According to one embodiment of the invention, the locking element has a guiding slot, into which the stopping element can engage. The stopping element thus has a duel function: on one hand, it forms an additional gliding surface for the guide of the locking element for it to be moved between the locking position and the release position, so as to avoid any jamming inside the guide. On the other hand, the stopping element forms an end-stop together with one end of the guiding slot, by means of which the release position is defined.

In one embodiment of the invention, the locking element has a stopping element for forming a stop in the locking position. This clearly defines the locking position and prevents the locking element from being able to be moved beyond the locking position along the guide. In addition to clearly defining the locking position, this stopping element is also used to prevent the locking element from falling out of the guide.

In one embodiment of the invention, one of the air ducts runs in a motor vehicle door, for example a driver's door or a passenger door. By means of a device according to the invention, this air duct is connected to an air duct formed in the so-called B-pillar of the motor vehicle when the motor vehicle door is closed.

Of particular advantage here is the fact that the generally rather larger tolerance of the position of the B-pillar relative to the driver's and/or passenger door can be compensated for at least partially by the connecting element according to the invention, in that to this end a corresponding snap-in position is selected for the connecting element. This reduces or totally prevents the occurrence of leak air in the area of transition between the motor vehicle door and the B-pillar, so that the air stream available for the ventilation, air conditioning and/or heating of the rear interior can accordingly reach the rear interior essentially undiminished.

This invention can also be used, for example, for connecting the air duct in a dashboard to the air duct going to the driver's or passenger's door.

In a further aspect, the invention pertains to a motor vehicle door which features an air duct, which is blanked off by a connecting element according to the invention. The connecting element according to the invention enables the motor vehicle door to be delivered to an assembly line completely preassembled. After the motor vehicle door is installed into the body-in-the-white, a balance of tolerance occurs by selecting the respective snap-in position for the connecting element.

In a further aspect, the invention pertains to a motor vehicle pillar, which features a connecting element in accordance with the invention. In this case, the balance of tolerance takes place by selecting a respective snap-in position of the connecting element relative to the motor vehicle pillar, in particular the B-pillar.

In a further aspect, the invention pertains to a motor vehicle interior paneling, which has or forms an air duct. To connect this air duct with another air duct, the motor vehicle interior paneling features a connecting element in accordance with the invention. The motor vehicle interior paneling component can be dashboard, which has an air duct discharge opening in a border area, which must be connected to the air duct running in the door when the driver's or passenger's door is closed.

BRIEF DESCRIPTION OF THE DRAWING

Embodiments of the invention with reference to the drawings will be described in more detail below. Shown here are.

DETAILED DESCRIPTION OF THE INVENTION

Elements in the figures below, which correspond to one another, are identified with the same reference marks.

Figure 1:
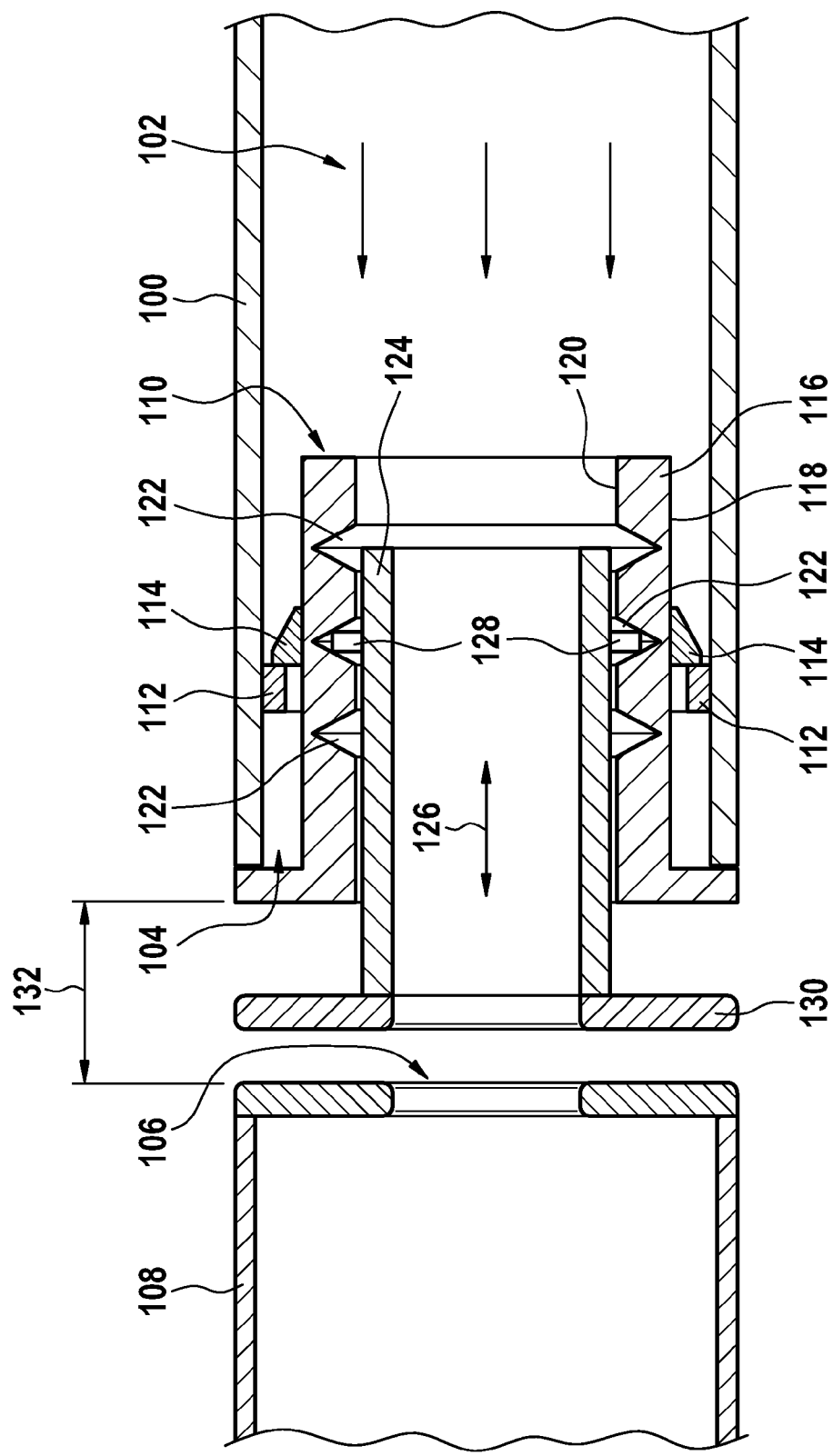
FIG. 1 is a cross section through an embodiment of a connecting element according to the invention for connecting two air ducts.

FIG. 1 shows an air duct 100 used to conduct air stream 102. Air stream 102 is produced, for example, from the fan of a motor vehicle.

Air duct 100 has an opening 104. Opposite opening 104 is an opening 106 of another air duct 108, into which air stream 102 is to be conducted with as little as possible or no loss. To this end, a device 110 is attached in opening 104 of air duct 100. To fasten device 110, air duct 100 has near its opening 104 one or more snap-in elements 112, which together with corresponding snap-in elements 114 of device 110 can form snap connections for fastening device 110 in opening 104 of air duct 100.

Device 110 has a fastening element 116, on whose external side 118 snap-in elements 114 are arranged. Fastening element 116 has various groove-like recesses 122 on its internal side 120, through which various snap-in positions of a connecting element 124 are defined. Three snap-in positions come into play for the embodiment being considered here; a larger or smaller number of snap-in positions can be defined, however, based on the respective number of grooves.

Connecting element 124 has a smaller cross section than fastening element 116, so that it can be pushed in and moved into fastening element 116 in indicated direction 126. On its exterior side, connecting element 124 has snap-in elements 128, which are designed for snapping into place in recesses 122.

Connecting element 124 has a seal 130, which may be designed as a circular sealing lip. Seal 130 is arranged so that it lies opposite to opening 106 of air duct 108.

By moving connecting element 124 in indicated direction 126, seal 130 can be positioned so that a gap 132 between air duct 100 and air duct 108 is completely bridged to the extent possible and seal 130 abuts opening 106. In the snap-in position thus selected, snap-in elements 128 engage into respective recesses 122.

In the embodiment example observed here, three different snap-in positions are defined by recesses 122. In place of this, only two different snap-in positions can be defined for positioning connecting element 124 relative to air duct 100 or a larger number of snap-in positions by a respectively larger number of recesses to enable a more precise adjustment of connecting element 124.

When it comes to installation, procedures can be such that fastening element 116 is first introduced into opening 104 of air duct 100, so that snap elements 112 and 114 produce a snap connection. The position of fastening element 116 is thereby determined relative to air duct 100.

In the following step, connecting element 124 is introduced into fastening element 116 and brought there into the desired snap-in position.

Figure 2:
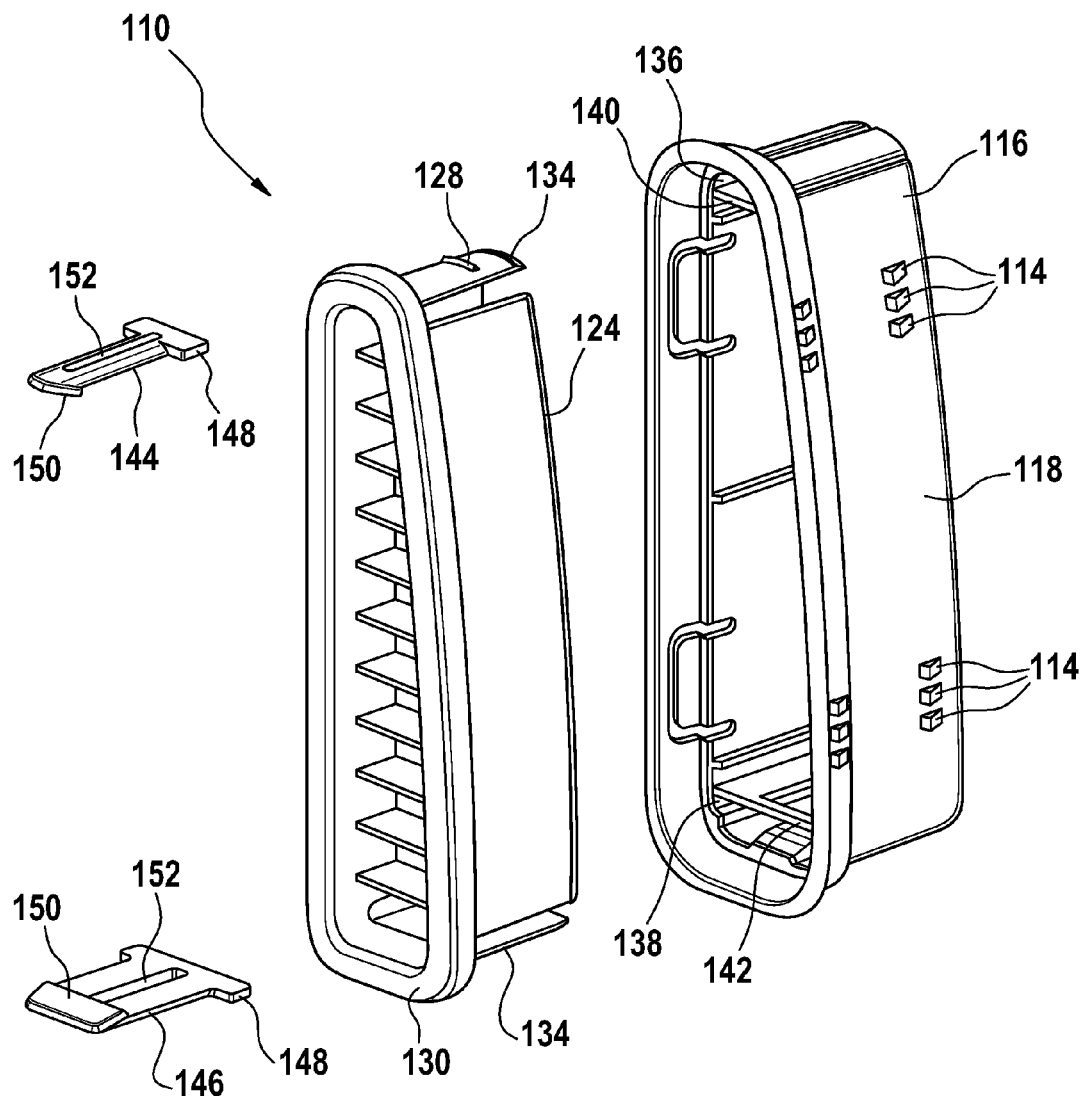
FIG. 2 is an exploded view, in perspective, of an embodiment of a connecting element according to the invention with locking elements.

FIG. 2 shows an embodiment of a device 100 according to the invention in an exploded view, in perspective.

In embodiment being observed here, snap-in elements 128 of connecting element 124 are arranged on two snap-on hooks 134 arranged opposite one another.

Guides 136 and 138 are created in fastening element 116, which are each blanked off by a bar 140 or 142. Guides 136 and 138 are used for receiving locking elements 144 or 146. Locking elements 144 and 146 each have a base 148, which has a generally rectangular form and by means of its lateral areas can engage with the respective guides 136 or 138. On the side situated opposite base 148, locking devices 144 and 146 are each blanked off by a stopping element 150. Stopping element 150 is essentially wedge-shaped in the embodiment under observation here. A guide slot 152 runs in the middle of both locking elements 140 and 146, which extends from stopping element 150 to base Basis 148.

For installation of device 110, procedures can be such that locking elements 144 and 146 are first moved into guides 136 or 138. Next, connecting element 124 is pushed into fastening element 116, while snap-on hooks 134 are moved above locking element 144 or below locking element 146. Snap-on hooks 134 thereby snap into place in recesses 122 with their snap-in elements 128 (see also FIG. 1). Due to locking elements 144 or 146, snap-on hooks 134 are blocked, so that connecting element 124 can no longer be moved inside of fastening element 116.

To select another snap-in position, locking elements 144 and 146 are pulled out of guides 136 or 138, whereby the blockade of snap-on hook 134 is released. Based on this, connecting element 124 within fastening element 116 can be moved into the desired snap-in position. As soon as connecting element 124 is in the desired snap-in position, locking mechanisms 144 and 146 can again be moved back along guide 136 or 138 to the respective locking position.

Figure 3:
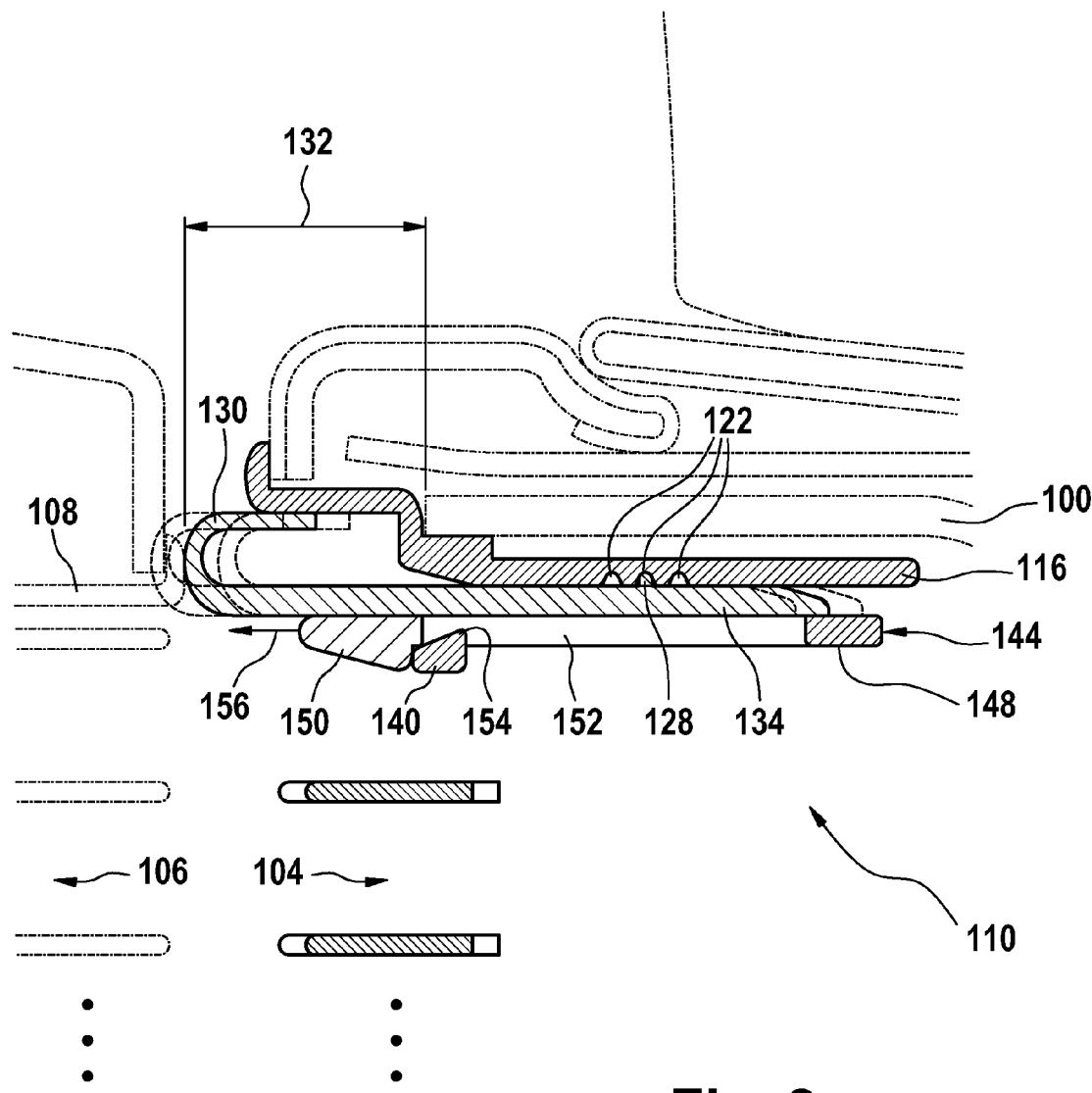
FIG. 3 is a partial cross section of an embodiment of a connecting element according to the invention with a depiction of various snap-in positions.

FIG. 3 shows a detail view of device 110 in assembly position corresponding to the depiction in FIG. 1, while only the upper area is depicted in the area of guide 136 (see also FIG. 2).

As shown in FIG. 3, bar 140 has a stopping element in the middle, which engages in guide slot 152 of locking element 144. In its position as depicted in FIG. 3, locking element 144 is in a locking position in which snap-on hook 134 is blocked. This locking position is defined by stopping element 150 of locking element 144 with a front fore-part of bar 140.

If locking element 144 is withdrawn from guide 136 in indicated direction 156, stopping element 154 glides through guide slot 152 until it forms a stop in the release position at base 148. In the release position, connecting element 124 inside fastening element 116 can be moved to a snap-in position defined by recesses 122. In the example of an embodiment being observed here, three different snap-in positions are defined by recesses 122, while a middle snap-in position has been chosen to bridge gap 132. The other two snap-in positions which are available are depicted in FIG. 3 by dotted lines to show the respective positions of seal 130 and snap-on hook 134.

Figure 4:
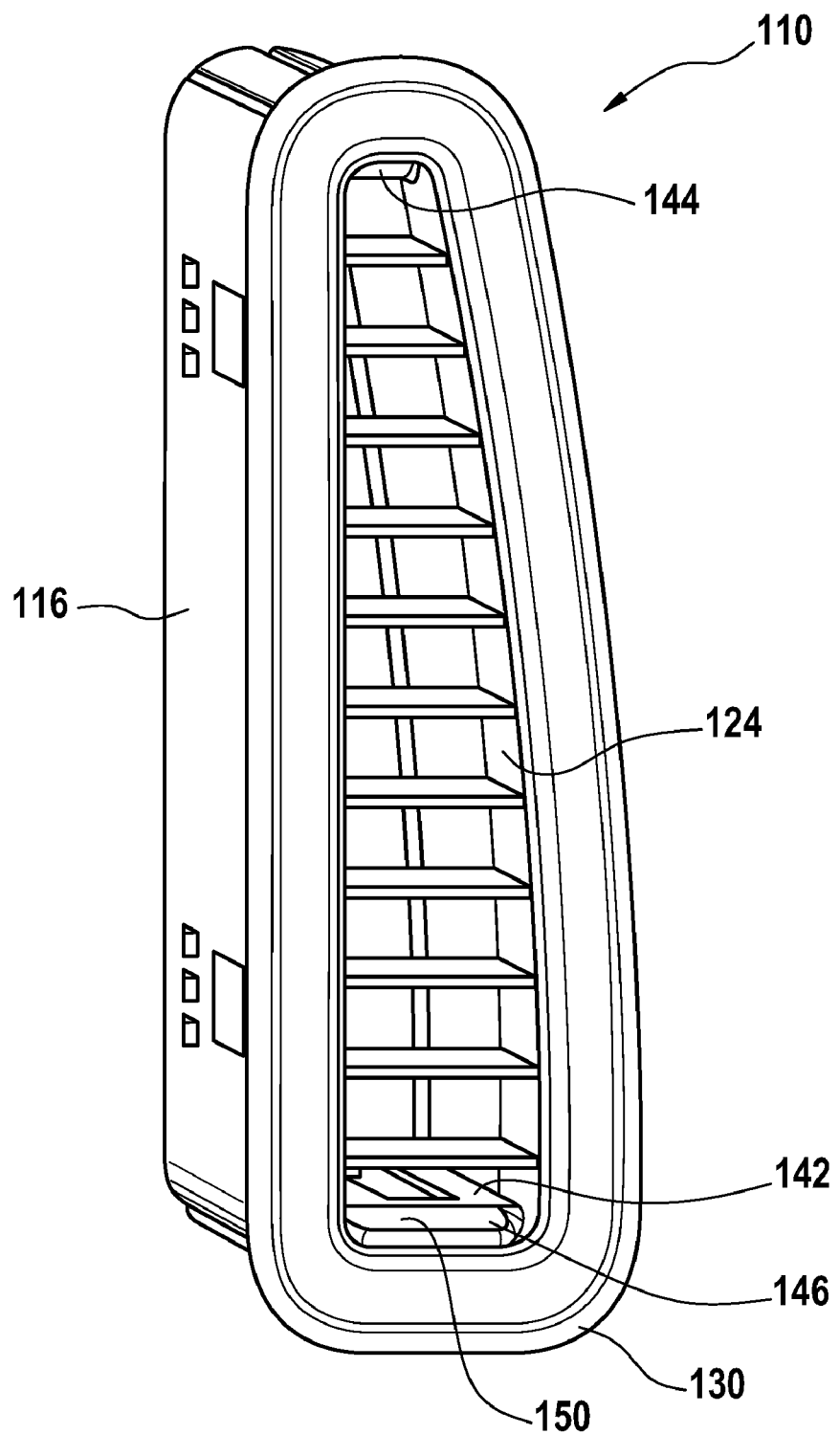
FIG. 4 is a view of the connecting element of FIGS. 2 and 3, in perspective.

FIG. 4 shows device 110 in the assembled state. In the assembled state, connecting element 124 is engaged in one of the defined snap-in positions with attaching element 116. Locking elements 144 and 146 are in their respective locking positions, while stops of stopping elements 150 are formed with bar 140 or 142.

Figure 5:
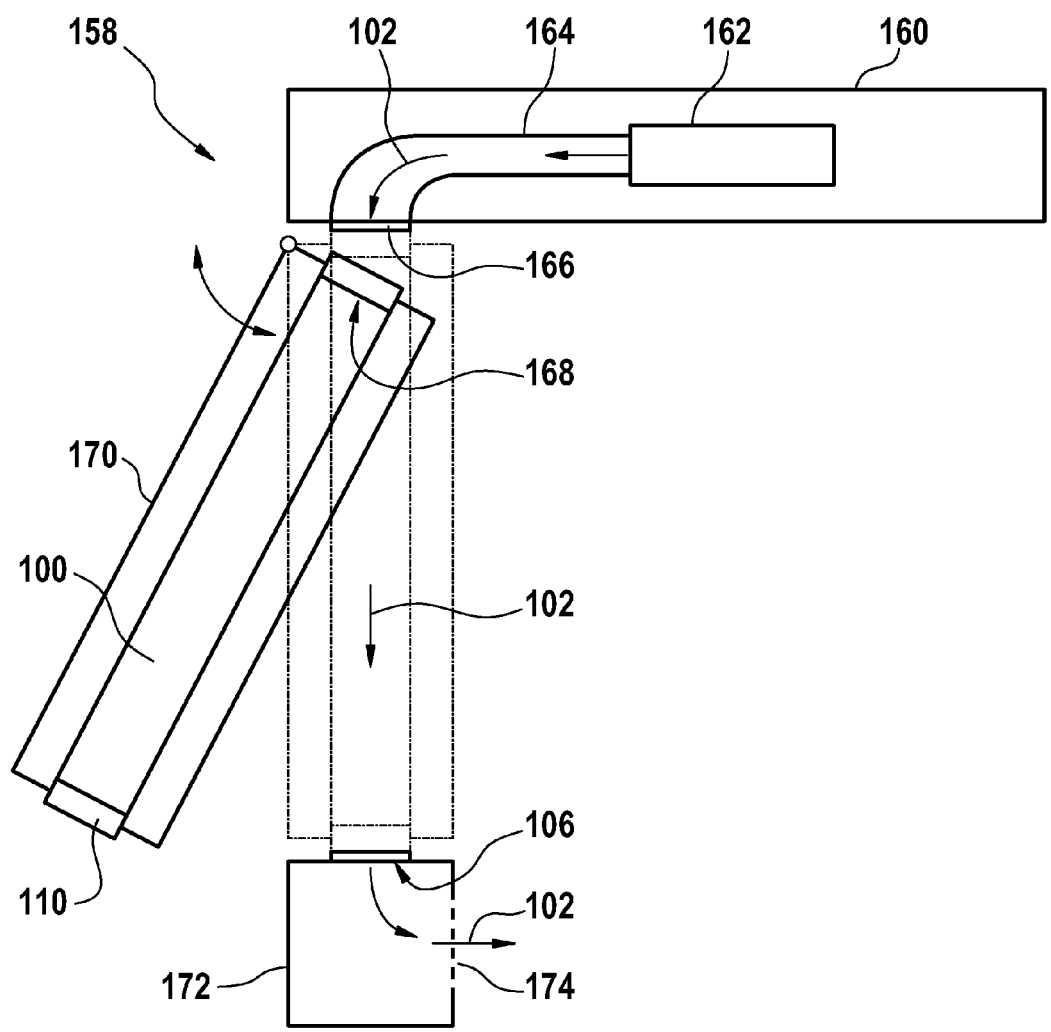
FIG. 5 is a schematic view from above of a motor vehicle with at least one connecting element according to the invention for transferring an air stream between air ducts.

FIG. 5 shows a schematic view from above of a motor vehicle 158. Motor vehicle 158 has a dashboard 160 under which a fan 162 of a motor vehicle heating and/or air conditioning system is located. From fan 162, an air duct 164 leads to an opening 166 of dashboard 160. Opening 166 of dashboard 160 is arranged in such a way, that it lies opposite an opening 168 of a motor vehicle door 170 when this door is closed. An air duct 100 runs inside motor vehicle door 170, which is blanked off by a device 110. When motor vehicle door 170 is closed, device 110 lies opposite an opening 106 of a B-pillar 172 of motor vehicle 158. Ventilation slots 174 are arranged on B-pillar 172, through which an air stream 102 produced by fan 162 can flow into the motor vehicle interior.

The following procedures will be followed, as an example, for installation in motor vehicle 158: first, the body of motor vehicle 158 is manufactured. With respect to the position of B-pillar 172 in particular, the body has relatively large tolerances, which can lie within the range of several millimeters.

Motor vehicle door 170 is supplied to the assembly line as a complete unit and installed in motor vehicle 158. If required, a balance of tolerance can be carried out to seal gap 132 (see also FIG. 1 and FIG. 3), by bringing connecting element 124 (see also FIGS. 1 to 4) into a respective snap-in position.

In the case of the embodiment of device 110 according to FIGS. 2 to 4, locking elements 144 and 146 are first pulled out from guides 136 or 138, until the respective bases 148 form a stop with stopping elements 154 arranged on bars 140 and 142. Snap-on hooks 134 are thereby released, so that connecting element 124 can be moved into the desired snap-in position, so that gap 132 is sealed. Following this, locking elements 144, 146 are moved back into their locking positions.

Alternatively or additionally, device 110 can also be arranged at opening 168 of motor vehicle door 170, opening 166 of dashboard 160 and/or at opening 106 of B-pillar 172, in order to create the respective balance of tolerance there.

The invention is by no means limited to air ducts which are swivel-mounted to each other. Device 110 according to the invention can also be used, for example, for a tailgate, the sliding door of a small transporter, minivan or the like.

LIST OF REFERENCE MARKS

100 Air duct
102 Air stream
104 Opening
106 Opening
108 Air duct
110 Device
112 Snap-in element
114 Snap-in element
116 Fastening element
118 Exterior
120 Interior
122 Recesses
124 Connecting element
126 Indicated direction
128 Snap-in element
130 Seal
132 Gap
134 Snap-on hook
136 Guide
138 Guide
140 Bar
142 Bar
144 Locking element
146 Locking element 148 Base
150 Stopping element
152 Guide slot
154 Stopping element
156 Indicated direction
158 Motor vehicle
160 Dashboard
162 Fan
164 Air duct
166 Opening
168 Opening
170 Motor vehicle door
172 B-pillar
174 Ventilation slots

The invention claimed is:

1. A device for connecting first and second air ducts, comprising:
   a connecting element for transferring an air stream between the air ducts, wherein the connecting element is operable to assume various snap-in positions relative to the first air duct and wherein the first air duct runs inside a motor vehicle door,
   a fastening element for fastening the connecting element to the first air duct, wherein the various snap-in positions are determined by the fastening element, the fastening element for each of the snap-in positions includes:
      at least one snap-in element, in order to form a second snap connection with the connecting element in a selected snap-in position, and
      a guide for at least one locking element for locking the second snap connection, wherein the locking element blocks a snap-on hook in a locking position and the locking element can be moved along the guide to a release position for releasing the snap-on hook.

2. The device of claim 1, wherein the connecting element includes a seal, which is operable to abut an opening of the second air duct.

3. The device of claim 2, wherein the seal is designed as a sealing lip.

4. The device of claim 1, wherein at least one of the first and second air ducts can be swiveled, and the first and second air ducts are separated from each other in a swivel position.

5. The device of claim 1, wherein the fastening element for forming an initial snap connection is formed by the first air duct.

6. The device of claim 1, wherein the connecting element includes at least one snap-on hook, in order to effect the second snap connection with the snap-in element of the selected snap-in position.

7. The device of claim 1, wherein the guide is blanked off by a bar and a first stopping element is arranged on the bar to form a stop with the locking element in the release position.

8. The device of claim 7, wherein the locking element features a guide slot and the first stopping element engages in the guide slot.

9. The device of claim 1, wherein the locking element features a second stopping element for forming a second stop in the locking position.

10. The device of claim 9, wherein the second stop is formed on a bar, through which the guide is blanked off.

11. The device of claim 1, wherein between two and ten snap-in positions, are provided.

12. A motor vehicle door, comprising;
   a connecting element for transferring an air stream between first and second air ducts, wherein the connecting element is operable to assume various snap-in positions relative to the first air duct and the first air duct runs inside the motor vehicle door,
   a fastening element for fastening the connecting element to the first air duct, wherein the various snap-in positions are determined by the fastening element, the fastening element for each of the snap-in positions includes:
      at least one snap-in element, in order to form a second snap connection with the connecting element in a selected snap-in position, and
      a guide for at least one locking element for locking the second snap connection, wherein the locking element blocks a snap-on hook in a locking position and the locking element can be moved along the guide to a release position for releasing the snap-on hook.

13. The motor vehicle door of claim 12, wherein the connecting element is arranged on a side of the motor vehicle door situated opposite a B-pillar in assembly position.

14. A motor vehicle pillar, comprising:
   a connecting element for transferring an air stream between first and second air ducts, wherein the connecting element is operable to assume various snap-in positions relative to the first air duct and the first air duct runs inside the motor vehicle door,
   a fastening element for fastening the connecting element to the first air duct, wherein the various snap-in positions are determined by the fastening element, the fastening element for each of the snap-in positions includes:
      at least one snap-in element, in order to form a second snap connection with the connecting element in a selected snap-in position, and
      a guide for at least one locking element for locking the second snap connection, wherein the locking element blocks a snap-on hook in a locking position and the locking element can be moved along the guide to a release position for releasing the snap-on hook.

15. A motor vehicle interior paneling component, comprising:
   a connecting element for transferring an air stream between first and second air ducts, wherein the connecting element is operable to assume various snap-in positions relative to the first air duct and the first air duct runs inside the motor vehicle door,
   a fastening element for fastening the connecting element to the first air duct, wherein the various snap-in positions are determined by the fastening element, the fastening element for each of the snap-in positions includes:
      at least one snap-in element, in order to form a second snap connection with the connecting element in a selected snap-in position, and
      a guide for at least one locking element for locking the second snap connection, wherein the locking element blocks a snap-on hook in a locking position and the locking element can be moved along the guide to a release position for releasing the snap-on hook.

16. The motor vehicle interior paneling component of claim 15, wherein the paneling component is a dashboard.

* * * * *